US010019339B2

(12) United States Patent
von Hanxleden et al.

(10) Patent No.: US 10,019,339 B2
(45) Date of Patent: *Jul. 10, 2018

(54) SEQUENTIALLY CONSTRUCTIVE MODEL OF COMPUTATION

(71) Applicant: NATIONAL INSTRUMENTS CORPORATION, Austin, TX (US)

(72) Inventors: Reinhard von Hanxleden, Kronshagen (DE); Michael Mendler, Bamberg (DE); Stephen R. Mercer, Austin, TX (US); Owen B. O'Brien, Austin, TX (US)

(73) Assignee: NATIONAL INSTRUMENTS CORPORATION, Austin, TX (US)

( * ) Notice: Subject to any disclaimer, the term of this patent is extended or adjusted under 35 U.S.C. 154(b) by 132 days.

This patent is subject to a terminal disclaimer.

(21) Appl. No.: 14/973,981

(22) Filed: Dec. 18, 2015

(65) Prior Publication Data

US 2016/0103760 A1 Apr. 14, 2016

Related U.S. Application Data

(63) Continuation of application No. 14/019,963, filed on Sep. 6, 2013, now Pat. No. 9,250,894.

(Continued)

(51) Int. Cl.
*G06F 11/36* (2006.01)
*G06F 8/75* (2018.01)
(Continued)

(52) U.S. Cl.
CPC .......... *G06F 11/3608* (2013.01); *G06F 8/314* (2013.01); *G06F 8/43* (2013.01);
(Continued)

(58) Field of Classification Search
CPC ... G06F 8/314; G06F 8/43; G06F 8/70; G06F 8/75; G06F 9/3836; G06F 11/3608; G06F 11/3688
See application file for complete search history.

(56) References Cited

U.S. PATENT DOCUMENTS 6,952,825 B1 * 10/2005 Cockx ...................... G06F 8/20
717/104
8,402,444 B2 3/2013 Ball
(Continued)

OTHER PUBLICATIONS

Albert Benveniste et al., "The synchronous languages 12 years later," 2003, Proceedings of the IEEE, vol. 91, Issue 1, pp. 64-83, downloaded from the Internet at <url>:http://ieeexplore.ieee.org/stamp/stamp.jsp?tp=&arnumber=1173191&tag=1.*

(Continued)

*Primary Examiner* — Geoffrey St Leger
*Assistant Examiner* — Stephen Berman
(74) *Attorney, Agent, or Firm* — Meyertons Hood Kivlin Kowert & Goetzel, P.C.; Jeffrey C. Hood; Michael B. Davis

(57) ABSTRACT

System and method for validating a program under a specified model of computation. The model of computation may be related to the synchronous statechart model of computation. A program may be received that specifies a plurality of operations using a variable within a logical tick such that the variable has multiple values within the logical tick. The program may be statically analyzed according to a specified model of computation that specifies program execution based on logical ticks, which may include determining that the program has deterministic semantics that specify deterministic results for each logical tick during execution of the program, including specifying deterministic results of the plurality of operations performed within the logical tick. The program may be validated in accordance with the specified (Continued)

model of computation in response to the determining. Such techniques may allow validation of a larger set of programs than conventional models while maintaining deterministic results.

17 Claims, 6 Drawing Sheets

Related U.S. Application Data

(60) Provisional application No. 61/698,290, filed on Sep. 7, 2012.

(51) Int. Cl.
*G06F 8/30* (2018.01)
*G06F 8/41* (2018.01)
*G06F 8/70* (2018.01)

(52) U.S. Cl.
CPC ............... *G06F 8/70* (2013.01); *G06F 8/75* (2013.01); *G06F 11/3688* (2013.01)

(56) References Cited

U.S. PATENT DOCUMENTS

| | | | |
|---|---|---|---|
| 8,806,450 B1* | 8/2014 | Maharana | G06F 11/3688 717/133 |
| 9,069,893 B2* | 6/2015 | Vechev | G06F 11/3608 |
| 2004/0176930 A1* | 9/2004 | Spinrad | G06F 11/3608 702/186 |
| 2005/0144602 A1* | 6/2005 | Ngai | G06F 8/41 717/151 |
| 2006/0225056 A1* | 10/2006 | Mukkavilli | G06F 8/43 717/141 |
| 2007/0169042 A1 | 7/2007 | Janczewski | |
| 2007/0234304 A1 | 10/2007 | Berg | |
| 2009/0150862 A1 | 6/2009 | Hamilton | |
| 2009/0307660 A1 | 12/2009 | Srinivasan | |
| 2009/0313600 A1* | 12/2009 | Ayers | G06F 8/433 717/106 |
| 2010/0318975 A1 | 12/2010 | Gustafsson | |
| 2011/0010690 A1* | 1/2011 | Howard | G06F 8/456 717/120 |
| 2012/0246662 A1* | 9/2012 | Vechev | G06F 11/3608 718/107 |
| 2013/0054221 A1 | 2/2013 | Artzi | |
| 2013/0086562 A1* | 4/2013 | Pistoia | G06F 8/43 717/132 |
| 2013/0152055 A1* | 6/2013 | Joshi | G06F 11/3604 717/131 |
| 2014/0053136 A1 | 2/2014 | Pistoia | |
| 2017/0075787 A1* | 3/2017 | Muske | G06F 8/00 |

OTHER PUBLICATIONS

Wikipedia, "Synchronous programming language," 2012, downloaded from the Wayback Machine Internet Archive at <url>:https://web.archive.org/web/20120622011022/https://en.wikipedia.org/wiki/Synchronous_programming_language.*
Lei Ju et al., "Context-Sensitive Timing Analysis of Esterel Programs," 2009, 46th ACM/IEEE Design Automation Conference, pp. 870-873, downloaded from the Internet at <url>:http://ieeexplore.ieee.org/stamp/stamp.jsp?tp=&arnumber=5227113.*
Goerigk, Wolfgang—"Compiler Verification Revisited"—Comupter-Aided Reasoning, vol. 4 of the series Advances in normal Methods, 2000, pp. 247-264, Springer Science+Business Media, New York, NY, USA (18 pages).
Bergan, Tom et al.—"CoreDet: A Compiler and Runtime System for Deterministic Multithreaded Execution"—proceedings of the Fifteenth Edition of Asplos on Architectural Support for Programming Languages and Operating Systems, Mar. 2010, pp. 53-64 (12 pages).
Leroy, Xavier—"Formal Verification of a Realistic Compiler"—Communications of the ACM, vol. 52, No. 7, Jul. 2009, pp. 107-115 (9 pages).

* cited by examiner

SEQUENTIALLY CONSTRUCTIVE MODEL OF COMPUTATION

PRIORITY DATA

This application is a continuation of U.S. patent application Ser. No. 14/019,963, titled "Sequentially Constructive Model of Computation," filed Sep. 6, 2013, which issued as U.S. Pat. No. 9,250,894 on Feb. 3, 2016, whose inventors are Reinhard von Hanxleden, Michael Mendler, Stephen R. Mercer, and Owen B. O'Brien, which claims benefit of priority of U.S. Provisional Application Ser. No. 61/698, 290, titled "Compiler that Operates According to a Sequentially Constructive Model of Computation" filed Sep. 7, 2012, whose inventors were Reinhard von Hanxleden, Michael Mendler, and Stephen R. Mercer; both of which are all hereby incorporated herein by reference in their entireties as though fully and completely set forth herein.

TECHNICAL FIELD

The present invention relates to the field of computer programming, and more particularly to a system and method for compiling programs according to a model of computation referred to herein as a sequentially constructive model of computation.

DESCRIPTION OF THE RELATED ART

Programs that implement concurrency are used to develop various kinds of applications. Typically, one of the challenges in developing these applications is the deterministic handling of concurrency. For example, embedded systems are often developed using programs that implement concurrency, and these systems often implement real-time applications that require deterministic behavior.

Some languages such as Java™ and C with Posix threads implement concurrency by adding unordered concurrent threads to a fundamentally sequential model of computation. This may generate write/write and write/read race conditions, which is problematic with regard to ensuring deterministic behavior.

As an alternative to this non-deterministic approach, the synchronous model of computation (MoC), exemplified by languages such as Esterel, Lustre, Signal and SyncCharts, approaches the matter from the concurrency side. Simultaneous threads still share variables. (The term "variable" is used in a generic sense that also encompasses streams and signals.) However, race conditions are resolved by deterministic, statically-determined scheduling, which ensures that within a macro tick, or tick for short: a) reads occur after writes; and b) each variable is written only once. A program that cannot be scheduled according to these rules is rejected by the compiler at compile time as being not causal, or not constructive.

A compiler that operates according to the synchronous MoC ensures that within each tick, all variables can be assigned a unique value. This provides a sufficient condition for a deterministic semantics, although it is not a necessary condition. Demanding unique variable values per tick not only limits expressiveness but also may run against the intuition of programmers versed in sequential programming, and make the task of producing a program free of "causality errors" more difficult than it needs to be. For example, a simple programming pattern such as:
  if (!done) { . . . ; done=true} cannot be expressed in a synchronous cycle because the variable "done" must first be written to within the cycle before it can be read. However, in this example, there is no race condition, nor even any concurrency that calls for a scheduler in the first place. Thus, it is not necessary to reject such a program in the interest of ensuring deterministic concurrency, as would be done by compilers that operate according to a traditional synchronous model of computation.

SUMMARY

Various embodiments of techniques for developing a software program are presented below.

In various embodiments, a sequentially constructive model of computation provides deterministic results while allowing sequential operations within a logical tick that are not acceptable in typical conventional models of computations. For example, in some embodiments, a variable may have multiple values within a logical tick if operations that use the variable are sequential with respect to each other.

In one embodiment, a method includes receiving a program that specifies a plurality of operations using a variable within a logical tick, such that the variable has multiple values within the logical tick. In this embodiment, the method includes statically analyzing the program according to a specified model of computation, which includes determining that the program has deterministic semantics. In this embodiment, deterministic semantics specify deterministic results for each logical tick during execution of the program, including specifying deterministic results of the plurality of operations performed within the logical tick. In this embodiment, the method includes validating the program in accordance with the specified model of computation in response to the determining. In some embodiments, such techniques may allow validation of a larger set of programs than conventional models of computation while maintaining deterministic results.

In another embodiment, a non-transitory computer-readable storage medium stores instructions that are executable by a computing device to perform operations including receiving a program that specifies relative sequencing of a first plurality of operations within a logical tick and does not specify relative sequencing of a second plurality of operations within the logical tick. In this embodiment, the operations include performing a static analysis of the program according to a specified model of computation including determining that the first plurality of operations preserves deterministic execution within the logical tick based on the sequence information and determining that the second plurality of operations meets a set of criteria for a deterministic result regardless of ordering. In one embodiment, one or more of the first plurality of operations do not meet one or more criteria of the set of criteria. In this embodiment, the operations include validating the program in accordance with the specified model of computation based on the static analysis.

Figure 1:
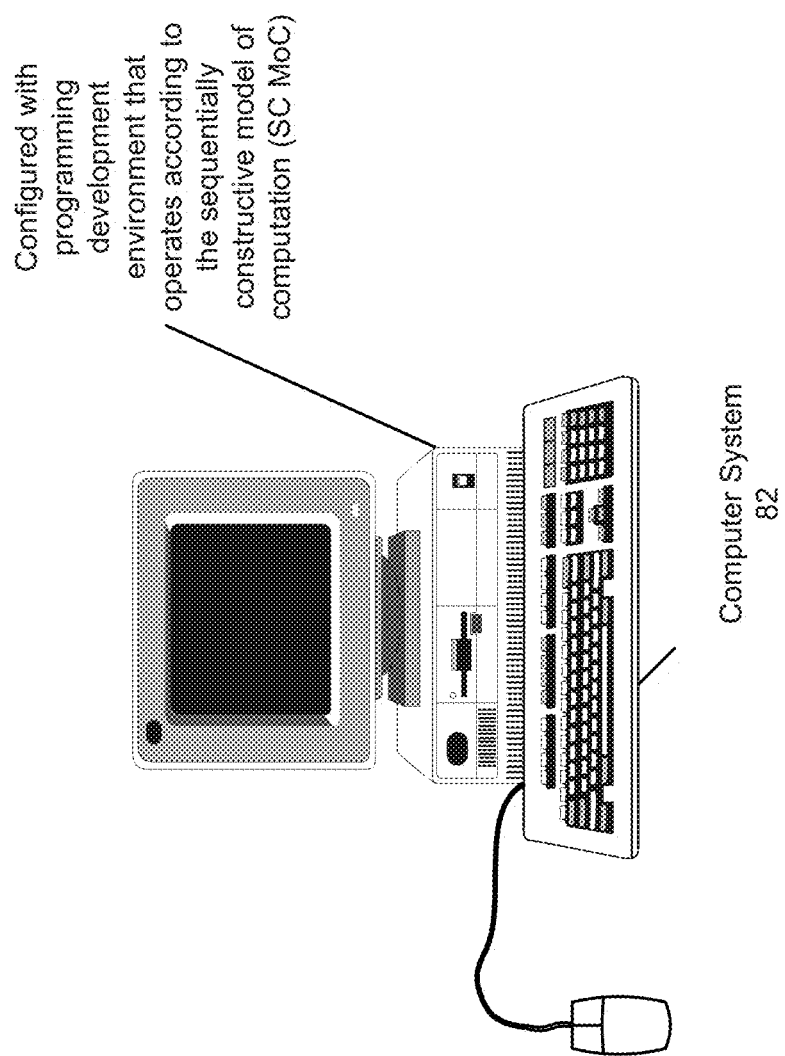
FIG. 1 illustrates one embodiment of a computer system configured with a programming development environment that operates according to a sequentially constructive model of computation (SC MoC)

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

Further, as used herein, the terms "first," "second," "third," etc. do not necessarily imply an ordering (e.g., temporal) between elements. For example, a reference to a "first" logical tick and a "second" logical may refer to any two different logical ticks. In short, references such as "first," "second," etc. may be used as labels for ease of reference in the description and the appended claims.

DETAILED DESCRIPTION

Incorporation by Reference

The following references are hereby incorporated by reference in their entirety as though fully and completely set forth herein:

U.S. Provisional Application Ser. No. 61/698,290, filed on Sep. 7, 2012.

Reinhard von Hanxleden, Michael Mendler, Joaquin Aguado, Björn Duderstadt, Insa Fuhrmann, Christian Motika, Stephen Mercer, & Owen O'Brien, Sequentially Constructive Concurrency—A Conservative Extension of the Synchronous Model of Computation, in Proceedings of the Design, Automation and Test in Europe Conference (DATE' 13), Grenoble, France, March 2013. IEEE.

Note that U.S. Provisional Application Ser. No. 61/698, 290, which was incorporated by reference above, includes as an appendix a paper titled "Sequentially Constructive Concurrency, A Conservative Extension of the Synchronous Model of Computation," authored by: Reinhard von Hanxleden, Michael Mendler, Joaquin Aguado, Björn Duderstadt, Insa Fuhrmann, Christian Motika, Stephen Mercer, Owen O'Brien, and Partha Roop. This paper, and the related conference paper, titled "Sequentially Constructive Concurrency—A Conservative Extension of the Synchronous Model of Computation," authored by Reinhard von Hanxleden, Michael Mendler, Joaquin Aguado, Björn Duderstadt, Insa Fuhrmann, Christian Motika, Stephen Mercer, and Owen O'Brien and also incorporated by reference above, each present various exemplary embodiments and exemplary definitions related to the present techniques; however, it should be noted that these exemplary embodiments and definitions are exemplary only, and are not intended to limit the invention or the meaning of the terms and definitions in the present disclosure to any particular form, function, appearance, or meaning. Further, if any definitions or usage of terms in the present disclosure differ in scope or meaning from definitions or usage in these references (papers), the definitions and usage in the present disclosure are controlling.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element;

encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java™, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Model of Computation—a formal description that includes a syntax (e.g., specification for the pictorial and/or textual system used to specify a document) and semantics (rules for computing behavior described by the syntax); used to specify the semantics of computation and concurrency. Examples of models of computation include data flow, control flow, state machine (e.g., finite state machine), actor, parallel random access machine, continuous time, spatial/temporal, synchronous/reactive, discrete event, cycle driven, synchronous message passing, asynchronous message passing, rendezvous, Turing machine, tagged signal, Petri nets, homogenous, heterogeneous, single rate, multi-rate, and combinations thereof, among others. Examples of different data flow models of computation include homogenous data flow, heterogeneous data flow, synchronous data flow, timed synchronous data flow, cyclostatic data flow, dynamic data flow, input bound data flow, and non-input bound data flow, among others. Some data flow models of computation may support explicit feedback loops, where, for example, output from a graphical program element may be provide as input to the same element, either directly, or via one or more other elements.

For example, the "G" graphical programming language, used in the LabVIEW™ graphical program development environment provided by National Instruments Corporation, supports a single-rate data flow model of computation. In contrast, Simulink™, provided by The MathWorks, Inc., supports a multi-rate data flow model of computation. Similarly, "G" generally operates according to input bound data flow semantics, where no node executes until all its inputs are present, whereas some other graphical programming languages, e.g., those directed to simulation, may allow a node to produce an output without all inputs being present.

Synchronous statechart model of computation—a model of computation wherein the nodes and their connections represent a statechart designed to be analyzable for determinism of output and timing constraints. Existing examples of the synchronous statechart model of computation include SyncCharts, SCADE and Esterel.

Data Flow Graphical Program (or Data Flow Diagram)—A graphical program or diagram comprising a plurality of interconnected nodes, wherein the connections between the nodes indicate that data produced by one node is used by another node. In an input bound data flow diagram, i.e., a data flow diagram with an input bound data flow model of computation, no node may execute or produce an output until all inputs are present, whereas a non-input bound data flow diagram may allow nodes to execute or produce output without all inputs being present. A data flow diagram is one model of computation.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Note that in the descriptions provided herein, "data flow diagram" is a superset of "graphical data flow program". For example, an executable data flow diagram may be considered a graphical data flow program. It should be noted, however, that in some embodiments, a data flow program or diagram may not be executable, but merely illustrative. Note that as used herein, unless otherwise indicated, "graphical program" refers to a graphical data flow program, which is an executable (or interpretable) data flow diagram. Note further that in various embodiments, an executable data flow diagram may be run by interpreting the diagram at runtime, may be compiled to generate machine executable code, and/or may be converted to some other programming language, e.g., C or C++, then compiled and executed, as desired.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

Statechart—A model of computation whose diagram indicates a plurality of states and transitions between the states. The diagram comprises state icons connected by wires, where the state icons represent states and the wires represent transitions between the states.

One or more of the state icons may represent a hierarchical state, where a hierarchical state is a state that includes one or more sub-states. For example, a statechart may include a state (a superstate) which includes states (sub-states). The sub-states may be AND states (e.g., parallel or concurrently active states) or OR states (e.g., states which are not concurrently active). The statechart may also include pseudostates (e.g., forks, joins, and/or junctions).

The statechart may be represented in the memory of the computer system as data structures and/or program instructions. The representation of the statechart stored in memory corresponds to the diagram and is either 1) executable; 2) operable to be converted to an executable program; or 3) interpretable, to perform the functionality indicated by the diagram.

A "State Diagram" is a type of statechart that does not have hierarchical states.

Overview

Various embodiments of a system and method for developing a software program are disclosed. The system and method may utilize a programming language and/or compiler that operates according to a new model of computation referred to herein as a "sequentially constructive model of computation" (SC MoC). This model of computation can be used to program embedded devices that implement safety-critical applications, among other kinds of applications.

The SC MoC is restrictive in that it demands a static analysis of the software program and a static scheduling that ensures determinism of the program. This is a feature not found in most traditional models of computation and programming languages, such as Harel's original Statecharts or Java™ threads. This may be a common feature among synchronous statechart models of computation. The SC MoC is more liberal than other synchronous statechart models of computation and programming languages, in that it allows a larger set of programs to be considered valid and to be compiled. For example, the SC MoC accepts some programs that have a natural, deterministic interpretation, but would not be allowed in SyncCharts, SCADE, and other traditional synchronous statechart languages. In particular, in the SC MoC, it is permitted to sequentially order a read before a write (e.g., "w=x; x=y" or "x=2*x+1") or to write to a variable multiple times (e.g., "busy=true; . . . ; busy=false"). These constructs are typically not permitted in traditional synchronous languages, because the constructs allow multiple values of a variable within a tick. However, these constructs are familiar to many programmers as well-known sequential programming techniques that do not cause any semantic ambiguities or non-determinism. Speaking generally, operations associated with sequence information may be handled using a less restrictive set of criteria for validating determinism, e.g., because determinism results from the ordering of the sequence. Programs may specify sequencing or sequence information for operations explicitly (e.g., by ordering statements separated by semicolons in a text program or by arrows in a statechart) or implicitly.

Various program languages may encode, specify, or partition execution of computations of a program in accordance with "logical ticks" or "ticks" (which as used herein is more general than the more restrictive "clock ticks"), in order to achieve functional synchronization. In other words, the logical ticks define or specify the resolution of functional synchronization for program execution. For example, computations within a logical tick may be interpreted as being instantaneous. Thus, as one particular (non-limiting) example, execution of computations within a logical tick may be performed over a time interval that begins when one or more threads receive input data and ends when the one or more threads have produced corresponding output data, although in general a logical tick does not inherently require any particular functionality to be performed. The duration of logical ticks may be fixed or may be variable (e.g., in order to move to the next logical tick as soon as the one or more threads are finished with the current computation). A logical tick may include a single operation or multiple operations (e.g., operations that implement a software function).

The SC MoC may be considered more liberal than some traditional synchronous models of computation in that it accepts more programs by virtue of being able to analyze and leverage sequencing information present in a program. Hence, one could say that the SC MoC is synchronous where it matters, namely when concurrency is involved, and non-synchronous where synchrony would be unnecessarily restrictive, namely when the sequential ordering inherent in the program code eliminates any scheduling uncertainties already.

In various embodiments the SC MoC may be used in conjunction with various kinds of programming languages, including textual programming languages (e.g., programming languages used to create a software program by writing lines of text-based code) and/or graphical programming languages (e.g., programming languages used to create a software program by creating a diagram or other graphical construct). For example, the system and method described herein may provide a programming environment that enables a user to develop a software program according to a textual and/or graphical programming language. The programming environment may include a compiler configured to statically analyze the program to determine whether the program conforms to the SC MoC. For example, the compiler may analyze the program to determine whether the program conforms to various rules such as described below. If not, then the compiler may reject the program, e.g., by indicating to the user that it cannot be compiled according to the SC MoC. The user may then modify the program to bring it into compliance with the SC MoC. Otherwise, if the program does adhere to the SC MoC, then the compiler may compile the program, e.g., for execution by one or more processors on a computer system and/or for execution by one or more programmable hardware elements (e.g., one or more FPGA devices) in an embedded system.

In particular, in some embodiments the SC MoC may be used to analyze and compile a statechart.

FIG. 1—Computer System

FIG. 1 illustrates a computer system 82 configured with a programming development environment that operates according to a sequentially constructive model of computation (SC MoC). The programming development environment may include a graphical user interface that enables a user to create a software program according to a textual and/or graphical programming language. For example, in some embodiments the program may be a statechart, and the graphical user interface of the programming development environment may enable the user to select the state icons for the statechart and connect them together, as well as configure transitions, guards, actions, and other elements of the statechart in order to visually represent the functionality desired by the user. The programming development environment may also include a compiler configured to statically analyze the program to determine whether the program conforms to the SC MoC, as described in detail below.

As shown in FIG. 1, the computer system 82 may include a display device on which the graphical user interface of the programming development environment is displayed as the program is edited by the user. The computer system 82 may also include one or more memory medium(s) on which the software of the programming development environment and the software programs created by the programming development environment may be stored. The memory medium may also store operating system software, as well as other software for operation of the computer system 82.

Exemplary Systems

The software programs created by the programming development environment of the computer system 82 may implement various kinds of functions or applications, including: safety-critical applications; real-time applications (e.g., in embedded systems); hardware control applications; test and/or measurement applications; controlling and/or modeling instrumentation or industrial automation hardware; modeling and simulation functions, e.g., modeling or simulating a device or product being developed or tested, etc. Exemplary test applications where the programs may be used include hardware-in-the-loop testing and rapid control prototyping, among others. The SC MoC and associated programming development environment described herein can be used for a plethora of different applications and are not limited to the above applications. In other words, applications discussed in the present disclosure are intended as illustrative examples. Other examples of applications include the control of other types of devices such as multimedia devices, video devices, audio devices, telephony devices, Internet devices, etc.

Figure 2:
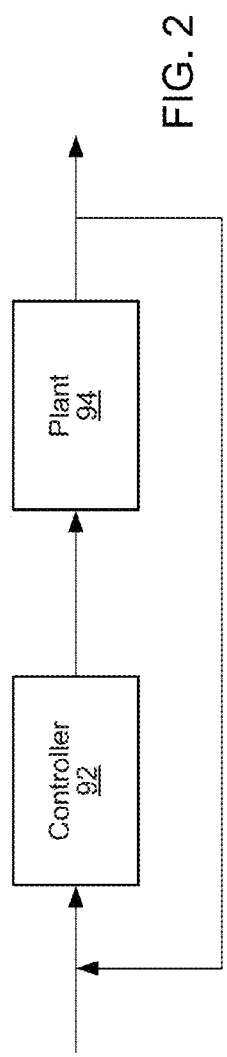
FIG. 2 is a high level block diagram of an exemplary system which may execute or utilize a program created according to the programming development environment disclosed herein.

FIG. 2 is a high level block diagram of an exemplary system which may execute or utilize a program created according to the programming development environment disclosed herein. FIG. 2 illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 can be the ECU and the plant 94 can be the car's engine (and possibly other components such as transmission, brakes, and so on.) A user may thus create a statechart or other program that specifies or implements the functionality of one or both of the controller 92 and the plant 94. For example, a control engineer may use a modeling and simulation tool to create a model (program) of the plant 94 and/or to create the algorithm (program) for the controller 92.

Figure 3:
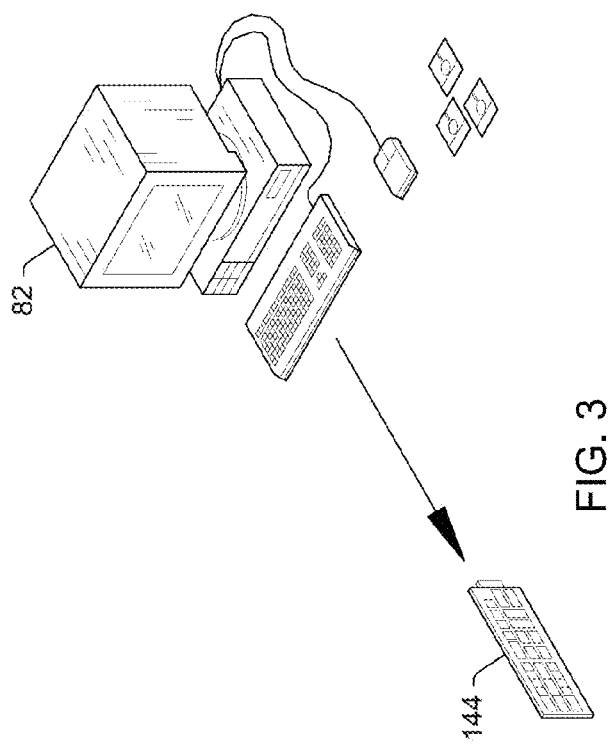
FIG. 3 illustrates an example of a system which may perform control and/or simulation functions.

FIG. 3 illustrates an example of a system which may perform control and/or simulation functions. The controller 92 may be implemented by a computer system 82 or other device (e.g., including a processor and memory medium and/or including a programmable hardware element) that executes or implements a statechart or other program. In a similar manner, the plant 94 may be implemented by a computer system or other device 144 (e.g., including a processor and memory medium and/or including a programmable hardware element) that executes or implements a statechart or other program, or may be implemented in or as a real physical system, e.g., a car engine.

In one embodiment, one or more statecharts or other programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a statechart, and the statechart may execute on the controller 92, e.g., on a computer system or other device. The computer system 82 may be a platform that supports real time execution, e.g., a device including a processor that executes a real time operating system (RTOS), or a device including a programmable hardware element.

In one embodiment, one or more statecharts or other programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments described herein, one or more of the various devices may couple to each other over a network, such as the Internet. Also, in some embodiments, the use may select a target device from a plurality of possible target devices for programming or configuration with one or more programs created by the programming development environment disclosed herein. Thus the user may create a statechart or other program on a computer and may then either use (execute) the program on that computer (or another computer), or may deploy the program to a target device (for remote execution on the target device) that is remotely located from the computer and coupled to the computer through a network.

Computer System Block Diagram

Figure 4:
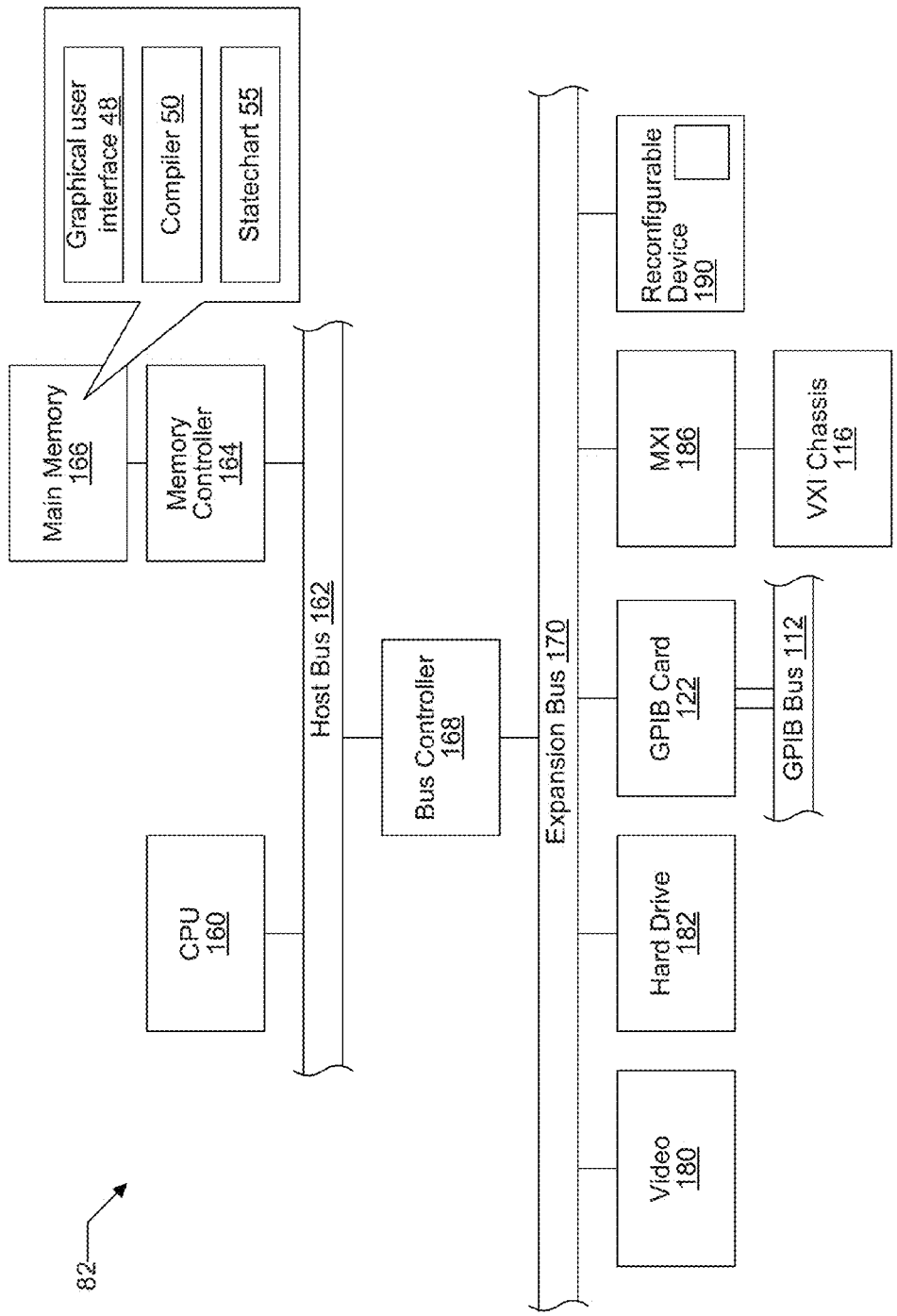
FIG. 4 is a block diagram representing one embodiment of the computer system which is configured with the programming development environment.

FIG. 4 is a block diagram representing one embodiment of the computer system 82 which is configured with the programming development environment. In general, the computer system may be any kind of computer system or computing device, such as a desktop computer system, tablet computer system, mobile computing system, workstation, server computer system, card installed in a chassis, etc. The computer system 82 may have any type of form factor or architecture. FIG. 4 illustrates a representative PC embodiment. Elements of a computer not necessary to understand the present description have been omitted for simplicity.

The computer system 82 may include at least one central processing unit (CPU) or processor 160 which is coupled to a processor or host bus 162. The CPU 160 may be any of various types, including an x86 processor, a CPU from the SPARC™ family of RISC processors, as well as others. A memory medium, typically comprising RAM and referred to as main memory, 166 may be coupled to the host bus 162 by means of memory controller 164. The main memory 166 may store various components or modules of the programming development environment, such as the graphical user interface module 48 and the compiler 50 which operates according to the SC MoC. The main memory 166 may also store one or more statecharts 55 or other types of software programs created by the programming development environment in response to user input to the graphical user interface module 48. The main memory 166 may also store operating system software, as well as other software for operation of the computer system 82.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, in some embodiments a reconfigurable device 190 may also be connected to the computer system 82. The reconfigurable device 190 may in some embodiments include a processor and memory which may execute a real time operating system. The device 190 may also or may instead include one or more programmable hardware elements. The programming development environment may include a feature for deploying a statechart 55 or other software program created by the programming development environment from the computer system 82 to the reconfigurable device 190 for execution of the statechart (or other program) on the reconfigurable device 190. In some embodiments the deployed statechart may take the form of program instructions or data structures that directly represent the statechart diagram. Alternatively, the deployed statechart may take the form of other types of program instructions generated based on the statechart diagram. For example, in some embodiments the deployed statechart may take the form of compiled code generated from either the statechart diagram or from text code that in turn was generated from the statechart diagram. In other embodiments the statechart may be deployed to a programmable hardware element of the reconfigurable device 190 via a netlist or bitstream describing hardware gates or other resources of the programmable hardware element and connections or relationships among the gates/resources.

Programming Language—Syntax, Semantics, and Compilation

In various embodiments, the programming development environment with which the computer system 82 is configured may provide users with the ability to create programs using various textual and/or graphical programming languages that use the SC MoC. In some embodiments, the language provides deterministic semantics. This is an important feature for developing many real-time applications. Deterministic semantics implies that the behavior of the program should not depend on arbitrary scheduling decisions, as is the case, for example, in an undisciplined use of Java™ or POSIX threads. More precisely, if there are two statements S1, S2 whose execution order matters, then the semantics of the language should define the execution order.

In some embodiments the language may be a programming language for creating a statechart. The syntax of the language may be similar to established statecharts variants, such as UML Statecharts. However, some of the semantics may be different. In particular, the language may provide for deterministic concurrency, with a static scheduling of concurrent actions (e.g., state actions, region actions, transition actions) derived from data dependencies. Actions that are already sequentially ordered by the statechart (e.g., an action such as "w=x; x=y") may be scheduled according to this sequential ordering, irrespective of their data accesses, e.g., because the ordering preserves deterministic execution.

The following description distinguishes between two types of writes (or value assignments) to a variable: 1) relative writes, or combinational writes, which apply some (typically commutative and associative) combination function to a variable, such as "x++", "x=x && y" or "x=max(x, y)," where the combination function is such that the order of their application does not influence the final result or any associated observable side effects, and 2) absolute (or non-relative) writes, which are all other writes, such as x=0 or x=2*x+1. A commutative and associative combination function may be sufficient condition, but not a necessary condition for deterministic specification of assignments/writes to a variable. In some embodiments, any function may be admitted provided the compiler is given sufficient instructions for recognizing how two or more instances of the function may be composited to achieve the same result regardless of the order of execution.

The scheduler component of the compiler may group and order actions such that for each variable accessed (with a write or read) by some concurrent actions without a specified ordering, the variable accesses of these concurrent actions are performed per the following sequence within a logical tick:

1. At most, one absolute write (Note: An alternative would be to allow an arbitrary number of identical absolute writes, in any order. For example, one could have multiple assignments such as "x=0" or "s=true" that do not conflict with each other, since it does not matter in which order they are scheduled. Multiple absolute writes may be possible if they do not have side effects.)
2. An arbitrary number of relative writes, of the same type, i.e., that use the same combination function, in any order. For example, the "max" and the "+" operation should not be mixed on the same variable in the same statechart.
3. An arbitrary number of reads, in any order.

If the scheduler cannot find a schedule that complies with the requirements listed above, e.g., due to concurrent absolute writes such that the execution of each logical tick may not be deterministic, then the compiler may reject the statechart as not being in compliance with the SC MoC followed by the statechart language.

In other embodiments, the compiler may be configured to use any of various criteria for operations that are concurrent relative to each other to determine whether the operations can be executed deterministically. This may include various levels of analysis, including, for example, whether the operations are commutative and associative, whether concurrent writes are guarded by expressions that are mutually exclusive (which may include analysis of what values can actually occur in the course of running a program), ordering of operations, types of operations (e.g., absolute/relative), etc. Further, in some embodiments, the compiler may be configured to perform different levels of analysis to determine what statements or operations occur in the same logical tick, e.g., by assuming that all statements or operations are executed in the same logical tick, using a linear tick count analysis, using a loop tick count analysis, etc.

Note that the rules and analysis discussed above may only apply to concurrent accesses, and in some embodiments, multiple sequential accesses are allowed to be performed without restrictions on access types, etc. In particular, in these embodiments, it is permissible for a variable to assume different values and/or be written multiple times within a tick when a sequence of operations that use the variable is specified by a program. This is a key difference to some traditional synchronous languages, including SyncCharts. It may make a significantly larger class of statecharts acceptable and may allow a more natural programming style, without raising causality issues and without affecting determinism. It may also alleviate the need to distinguish concurrent data types, such as Esterel/SyncChart signals, and sequential data types, such as Esterel/SyncChart variables, and it may allow sequential and concurrent accesses to the same variable to be mixed.

Figure 5:
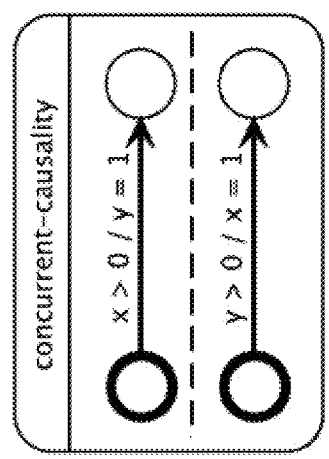
FIG. 5 illustrates an example of a statechart program that may be rejected (e.g., considered invalid) by the programming development environment that operates according to the SC MoC.
Figure 6:
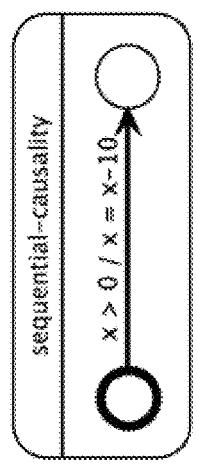
FIG. 6 illustrates an example of a statechart program that may be accepted (e.g., considered valid) by the programming development environment that operates according to the SC MoC.

To illustrate these differences, consider the simple statecharts shown in FIGS. 5 and 6. The "concurrent-causality" statechart of FIG. 5 has a concurrent cyclic dependency carried by the variables x and y. The write-read dependency carried by x specifies that first the lower region should be executed, then the upper region. The write-read dependency carried by y specifies the converse. The result is a scheduling dependency cycle that cannot be resolved deterministically, and the statechart would thus be rejected by the compiler in one embodiment of the SC MoC. (This statechart would also be rejected by a compiler that operates according to a traditional synchronous model of computation.) Note however, that were the program of FIG. 5 to specify a sequence for the operations, or a specific set of initial states, from which the writes are not executable or not in conflict with the reads, the program would be in compliance with the SC MoC because it would specify deterministic semantics (note that such a program in this particular example may not have any useful function).

Other examples of sets of operations that cannot always be performed within a logical tick with deterministic results (assuming no sequencing information is specified) may include: a read of a variable and an absolute assignment/write to the variable, many assignment operations that are not commutative relative to each other, and/or assignment operations that reference the variable assigned such as "x=2*x" and "x=x+3", etc.

"Deterministic results" for a variable may refer to a final result of the variable within a logical tick as well as any observable side effects of values of the variable during the logical tick. For example, if y is assigned as a function of x and x can take on multiple values within a logical tick, the final value of y for the tick is a side effect of operations using x and should be deterministic to achieve deterministic results for x within the logical tick.

The "sequential-causality" statechart of FIG. 6 has a sequential cyclic dependency, carried by x. This statechart would be rejected by a compiler that operates according to a traditional synchronous model of computation because x may have different values within one tick (an initial value of x is read, and if the initial value is greater than 0, x assumes a second value of x−10 within the same logical tick). However, in some embodiments, since a compiler of a programming development environment that operates as disclosed herein may take the inherent sequentiality expressed by the statechart into account, the statechart may be accepted (e.g., may be considered valid) by the compiler. This may be desirable behavior since the statechart has a natural, deterministic interpretation. Another example of deterministic semantics includes the following sequence of operations 1-3 within a logical tick:

$$x=3*x; \quad (1)$$

$$x=x+2; \quad (2)$$

$$x=x^2; \quad (3)$$

In this example, because the semi-colons explicitly specify a sequence for the operations (assuming a programming language that uses semi-colons in this way, such as C with Posix threads, assuming a sequential memory model, for example), in some embodiments the compiler may be configured to determine that a program with these operations has logical semantics for a logical tick. In contrast, if these operations were included as concurrent operations in a logical tick without sequencing information, in some embodiments the compiler may be configured to reject such a program as not sequentially constructive because the program would not have deterministic semantics within the logical tick that included operations 1-3.

Figure 7:
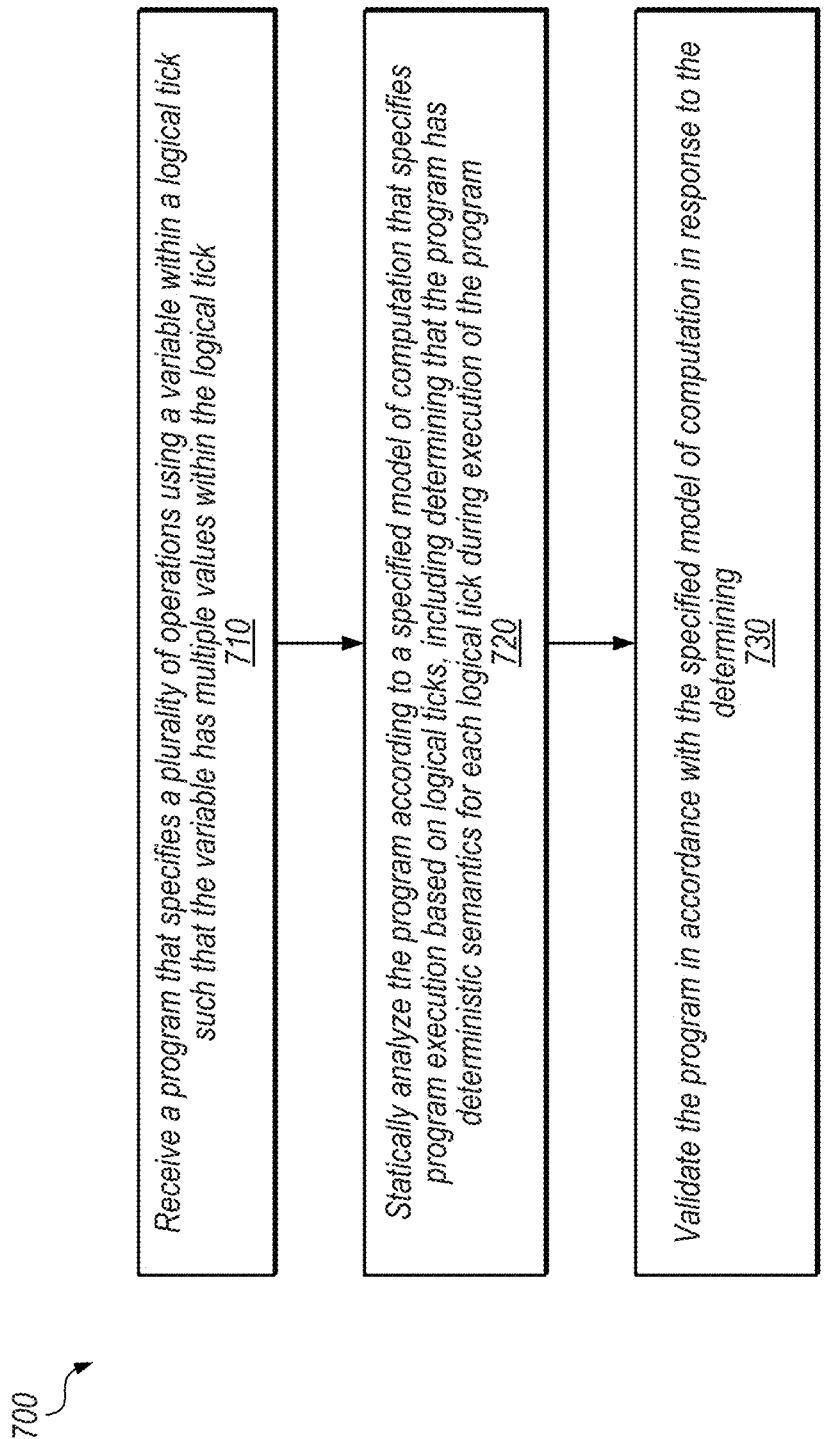
FIG. 7 is a flow diagram illustrating one embodiment of a method for validating a program in accordance with a specified model of computation.

Turning now to FIG. 7, a flow chart illustrating one exemplary embodiment of a method 700 for validating a program in accordance with a specified model of computation is shown. The method shown in FIG. 7 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 710.

At block 710, a program may be received that specifies a plurality of operations using a variable within a logical tick such that the variable has multiple values within the logical tick. For example, the variable may be read as one value and then assigned another value within the logical tick. As another example, the program may specify multiple writes to the variable within the logical tick. The program may be text-based or may graphical. In some embodiments, the program may be a statechart or state diagram. Flow proceeds to block 720.

At block 720, the program may be statically analyzed according to a specified model of computation that specifies program execution based on logical ticks. In some embodiments, the specified model of computation may be a synchronous model of computation. In one embodiment, the model of computation is the sequentially constructive model of computation. In this embodiment, the statically analyzing may include determining that the program has deterministic semantics for each logical tick during execution of the program. The deterministic semantics may preserve sequential execution of operations when sequential operation is necessary for deterministic results and may allow concurrent execution of operations when deterministic results are assured. The determining may include requiring a set of criteria for a deterministic result regardless of ordering for operations that are concurrent with each other. Operations that are sequential to each other may fail one or more of the set of criteria, but may be valid according to the specified model of computation based on their specified sequence. As indicated, flow may proceed to block 730.

At block 730, the program may be validated in accordance with the specified model of computation in response to the determining. In some embodiments, the steps of FIG. 7 are performed by the compiler, which may compile the program for deterministic execution after validating the program. Flow ends at block 730.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method, comprising:
   utilizing a computing system to perform:
      receiving a program, wherein the program specifies a plurality of operations using a variable within a logical tick such that the variable has multiple values within the logical tick, wherein said having multiple values comprises transitioning from an initial value to a second value within the logical tick, wherein all computations within the logical tick are interpreted as being instantaneous, and wherein logical ticks specify the resolution of functional synchronization for execution of the program;
      statically analyzing the program according to a specified model of computation that specifies synchronous program execution based on logical ticks, wherein said statically analyzing the program includes:
         determining that the program has deterministic semantics, wherein the deterministic semantics specify deterministic results for each logical tick during execution of the program, including specifying deterministic results of the plurality of operations performed within the logical tick, wherein the deterministic results comprise a final result of the variable within the logical tick and observable side effects of the multiple values of the variable during the logical tick; and validating the program in accordance with the specified model of computation in response to said determining; and using a compiler or interpreter, transforming the program to produce deterministically executable output code and executing the deterministically executable output code.

2. The method of claim 1, wherein at least a portion of the plurality of operations are concurrent with respect to each other and wherein at least a portion of the plurality of operations are sequential with respect to each other.

3. The method of claim 1, wherein the deterministic semantics is based on, within a given logical tick:

scheduling operations that are concurrent with each other such that assignments to the variable are performed before reads of the variable; and scheduling assignment operations to a variable that are concurrent with each other such that a first assignment operation is scheduled before one or more other assignment operations, wherein the order of the one or more other assignment operations does not influence the final result of the variable for the logical tick.

4. The method of claim 1, wherein said determining that the program has deterministic semantics is based on sequencing information specified by the program for at least a portion of the plurality of operations.

5. The method of claim 4, wherein the program explicitly specifies the sequencing information.

6. The method of claim 4, wherein the at least a portion of the plurality of operations do not specify the deterministic result without the sequencing information.

7. The method of claim 1, wherein the plurality of operations include a read of the variable before an absolute assignment to the variable.

8. A non-transitory computer-readable storage medium having instructions stored thereon that are executable by a computing device to perform operations comprising:

receiving a program, wherein the program specifies a plurality of operations using a variable within a logical tick such that the variable has multiple values within the logical tick, wherein said having multiple values comprises transitioning from an initial value to a second value within the logical tick, wherein all computations within the logical tick are interpreted as being instantaneous, and wherein logical ticks specify the resolution of functional synchronization for execution of the program;

statically analyzing the program according to a specified model of computation that specifies synchronous program execution based on logical ticks, wherein said statically analyzing the program includes:

determining that the program has deterministic semantics, wherein the deterministic semantics specify deterministic results for each logical tick during execution of the program, including specifying deterministic results of the plurality of operations performed within the logical tick, wherein the deterministic results comprise a final result of the variable within the logical tick and observable side effects of the multiple values of the variable during the logical tick; and validating the program in accordance with the specified model of computation in response to said determining; and using a compiler or interpreter, transforming the program to produce deterministically executable output code and executing the deterministically executable output code.

9. The non-transitory computer-readable storage medium of claim 8, wherein at least a portion of the plurality of operations are concurrent with respect to each other and wherein at least a portion of the plurality of operations are sequential with respect to each other.

10. The non-transitory computer-readable storage medium of claim 8, wherein the deterministic semantics is based on, within a given logical tick:

scheduling operations that are sequential with respect to each other as specified by the program according to a specified sequence; and scheduling assignment operations to a variable that are concurrent with each other such that a first assignment operation is scheduled before one or more other assignment operations, wherein the order of the one or more other assignment operations does not influence the final result of the variable for the logical tick.

11. The non-transitory computer-readable storage medium of claim 8, wherein said determining that the program has deterministic semantics is based on sequencing information specified by the program for at least a portion of the plurality of operations.

12. The non-transitory computer-readable storage medium of claim 11, wherein the at least a portion of the plurality of operations do not specify the deterministic result without the sequencing information.

13. The non-transitory computer-readable storage medium of claim 8, wherein the plurality of operations include a read of the variable before an absolute assignment to the variable.

14. A computer system comprising:

one or more processors; and memory storing program instructions, wherein the program instructions are executable by one or more processors to cause the computer system to perform operations including:

receiving a program, wherein the program specifies a plurality of operations using a variable within a logical tick such that the variable has multiple values within the logical tick wherein said having multiple values comprises transitioning from an initial value to a second value within the logical tick, wherein all computations within the logical tick are interpreted as being instantaneous, and wherein logical ticks specify the resolution of functional synchronization for execution of the program;

statically analyzing the program according to a specified model of computation that specifies synchronous program execution based on logical ticks, wherein said statically analyzing the program includes:

determining that the program has deterministic semantics, wherein the deterministic semantics specify deterministic results for each logical tick during execution of the program, including specifying deterministic results of the plurality of operations performed within the logical tick, wherein the deterministic results comprise a final result of the variable within the logical tick and observable side effects of the multiple values of the variable during the logical tick; and validating the program in accordance with the specified model of computation in response to said determining; and using a compiler or interpreter, transforming the program to produce deterministically executable output code and executing the deterministically executable output code.

15. The computer system of claim 14, wherein at least a portion of the plurality of operations are concurrent with respect to each other and wherein at least a portion of the plurality of operations are sequential with respect to each other.

16. The computer system of claim 14, wherein the deterministic semantics is based on, within a given logical tick:

scheduling operations that are sequential with respect to each other as specified by the program according to a specified sequence; and scheduling operations that are concurrent with each other such that assignments to the variable are performed before reads of the variable.

17. The computer system of claim 14, wherein said determining that the program has deterministic semantics is based on the program specifying sequencing information for at least a portion of the plurality of operations.

* * * * *